United States Patent [19]
Costa et al.

[11] Patent Number: 5,095,617
[45] Date of Patent: Mar. 17, 1992

[54] METHOD FOR FORMING A DRAIN ASSEMBLY

[75] Inventors: Mark W. Costa, Storrs, Conn.; Steven P. Shach, Beltsville, Md.

[73] Assignee: United Technologies Corporation, Hartford, Conn.

[21] Appl. No.: 626,115

[22] Filed: Dec. 4, 1990

Related U.S. Application Data

[62] Division of Ser. No. 316,901, Feb. 28, 1989.

[51] Int. Cl.$^5$ .............................................. F02G 3/00
[52] U.S. Cl. .................................. 29/889.2; 29/513; 29/888; 60/39.094
[58] Field of Search ............... 29/889.2, 888, 513; 60/39.094, 39.08, 39.11; 270/374

[56] References Cited

U.S. PATENT DOCUMENTS 1,865,319  6/1932  Jensen .
3,199,716  8/1965  Price ................................... 220/44
4,163,366  8/1979  Kent ................................ 60/266 R

*Primary Examiner*—Irene Cuda
*Attorney, Agent, or Firm*—Gene D. Fleischhauer

[57] ABSTRACT

A method of forming a drain assembly 30 for a case 26 is disclosed. Various construction details are developed for minimizing the radial profile and facilitating assembly to an opening in the case while blocking the passage of flames from the exterior to the interior. In one embodiment, the method of forming the drain assembly 30 includes disposing a cover 42 facing one side of the case which has a passage 48 therethrough, disposing a plate 58 having a passage 62 on the other side of the case, and disposing a baffle 66 in the opening to block flames from passing between the cover side of the case and the plate side of the case.

5 Claims, 3 Drawing Sheets

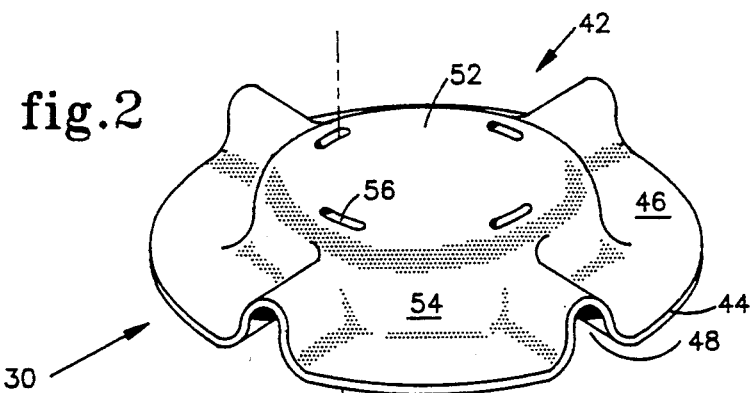
fig.2
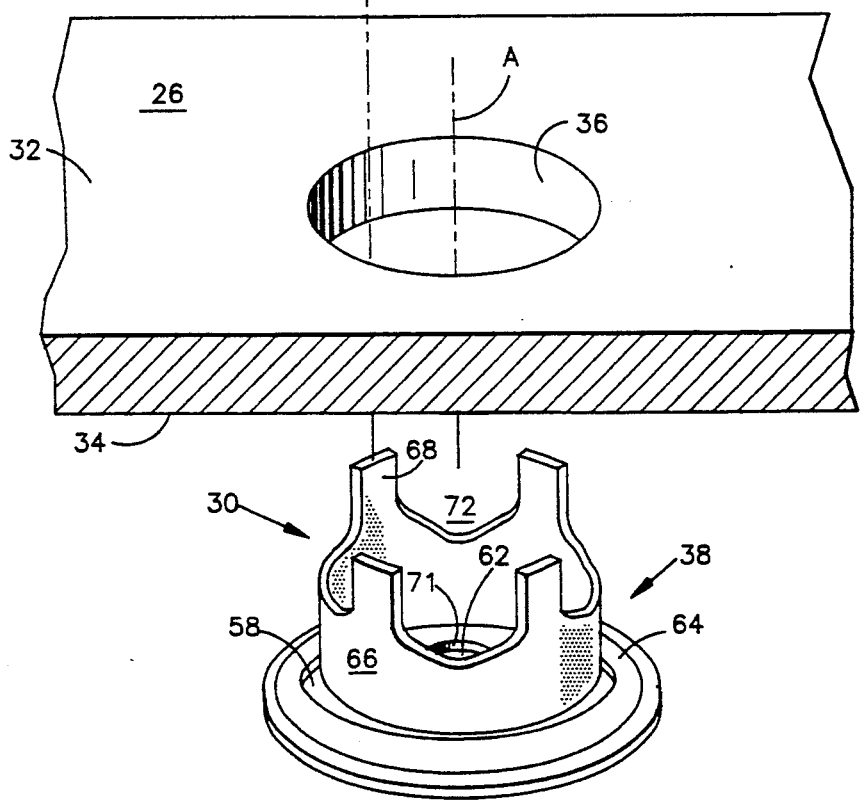
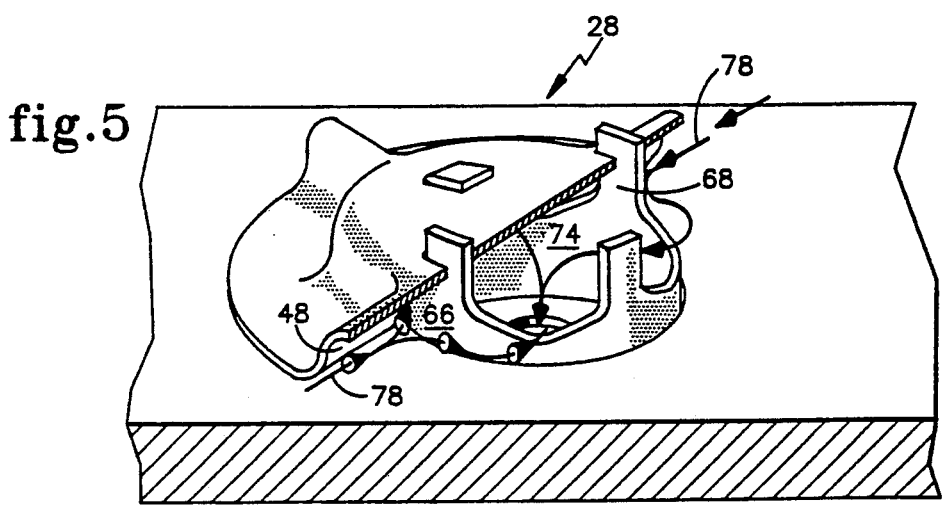
fig.5

METHOD FOR FORMING A DRAIN ASSEMBLY

This is a division of co-pending application Ser. No. 07/316,901 filed on Feb. 28, 1989.

TECHNICAL FIELD

This invention relates to axial flow, gas turbine engines and more particularly to a drain assembly for the case of such an engine. This invention was developed in the field of aircraft gas turbine engines and has application to other structures employing a drain assembly.

BACKGROUND OF THE INVENTION

One example of a gas turbine engine is a turbofan, gas turbine engine of the type used to propel aircraft. The turbofan engine has a primary flowpath for working medium gases which is annular in shape. The annular flowpath extends through a compression section, a combustion section, and a turbine section. The engine has a rotor assembly which extends axially through these sections of the engine. A stator assembly, which includes an engine case, extends axially through the engine outwardly of the rotor assembly to bound the working medium flowpath and to support the rotor assembly of the engine.

A secondary flowpath for working medium gases is annular in shape and extends axially rearward through the engine outwardly of the primary flowpath. The stator assembly includes a portion of the engine case which provides an inner boundary to the secondary flowpath and a portion of a fan duct which provides an outer boundary to the flowpath.

During engine operation, fuel is supplied to the combustion section where it is burned to produce energy. The energy is used to develop a propulsive thrust and to drive the rotor assembly about an axis of rotation. Hydraulic and lubricating fluids are supplied to other sections of the engine for hydraulic actuators and for lubricating moving components.

The fuel, hydraulic and lubricating systems may develop small, intermittent leaks which occur during engine operation. As a result, fluids may accumulate at very low rates at the bottom of the engine on the interior of the engine case. Because these fluids are flammable, it is desirable to drain the fluids via an opening in the engine case into the secondary flowpath. The large volume of rushing gases in the secondary flowpath sweeps away the small amount of fluid draining from the case during engine operation at a flammable fluid to air ratio which does not support combustion.

One disadvantage of a drain opening is that the opening provides a path for flames to the inside should a fire occur outside the engine or a path for flames to the outside should a fire occur on the inside of the engine. Accordingly, it is desirable to provide a device for draining fluids from the case that blocks flames from passing through the device from the inside of the case to the outside or from the outside to the inside.

One example of a device which might be used in other fields is shown in U.S. Pat. No. 1,960,259 entitled "Safety Device" which was issued to Wyman. In the Wyman construction, a plug threadably engages a case. The case has an axially extending inlet passage, an axially extending outlet passage, and an axially extending apparatus for blocking flames which extends from the inlet to the outlet passage. The apparatus includes a number of axially spaced disks. Each disk has a chordal segment cut away to provide an opening which axially faces the adjacent disks. This forms a tortuous path from the inlet to the outlet which is easily followed by the draining fluid while providing an effective device for blocking the passage of flames.

It is important in gas turbine engines to avoid using a drain assembly which intrudes into the secondary flowpath because the intrusion disrupts the flow in the secondary flowpath with a concomitant decrease in aerodynamic performance. In addition, it is important to minimize how far the device extends into the engine interior because of close clearances between the engine case and structures on the interior of the engine. The clearances are kept close to minimize the radial profile of the engine which decreases drag on the engine during operative conditions.

Accordingly, scientists and engineers working under the direction of Applicants, assignee are working to develop a drain assembly for an engine case, which has a low profile to fit in the clearance between the engine case and structure inwardly of the engine case, and which allows fluids to freely flow from the interior while providing a barrier to flames.

DISCLOSURE OF THE INVENTION

According to the present invention, a drain assembly having a chamber for collecting fluid prior to discharge has an inlet passage and an outlet passage which are perpendicular to each other, a baffle between the passages which blocks the one of the passages from line of sight communication with the chamber and a manifold which extends laterally with respect to one of the passages to provide a passage for fluid and a tortuous path for flame.

In accordance with one embodiment of the present invention, the drain assembly extends through an opening in the engine case of a gas turbine engine and includes a cover on one side of the case bounding the inlet passage and a plate on the other side of the case bounding the outlet passage; the cover and plate are urged toward the case by the baffle with a resilient compound disposed between the drain assembly and the case to provide sealing and to damp vibrations in the drain assembly.

In accordance with one detailed embodiment of the present invention, the inlet has a plurality of inlet passages and the baffle has a plurality of tabs which extend outwardly at each inlet passage to block line of sight communication with the chamber and to engage the cover to urge the cover toward the engine case.

A primary feature of the present invention is a drain assembly for an opening having a cover on one side of a structure, (such as an engine case for a gas turbine engine) and a plate on the other side of the structure leaving a drain chamber therebetween. Another feature is a baffle disposed in the opening between the cover and the plate to bound the drain chamber. In one embodiment, the baffle extends laterally to block line of sight communication between an inlet passage and the drain chamber. Another feature is a manifold between the cover and the baffle which extends from the inlet passage to the drain chamber. In a more detailed embodiment, the baffle is attached to the plate and is attached to the cover to urge the cover and the plate toward the engine case. The baffle has a plurality of tabs which extend through the cover and are bent over during assembly to retain both the plate and the cover.

Another feature is a resilient material disposed between the drain assembly and the engine case.

A principal advantage of the present invention is the low profile of a flame proof drain assembly for a case which results from the plate and cover construction with the cover having passage for fluid which extends parallel to the case. Another advantage is the ease of fabricability resulting from the use of a simple three element structure to provide a flameproof drain to an opening in a case. Still another advantage is the simplicity of the structure and the ability of the structure to adapt to casings having different thicknesses. In one detailed embodiment, an advantage the fatigue life of the structure which results from using sealing material to reduce vibrations in the drain assembly.

The foregoing features and advantages of the present invention will become more apparent in light of the following detailed description of the best mode of carrying out the invention and in the accompanying drawings.

BRIEF DESCRIPTION OF DRAWINGS

FIG. 2 is a partial perspective view of a portion of the engine case and an exploded perspective view of the drain assembly.

FIG. 5 is a partial perspective view in schematic fashion showing the relationship of the structure to a flowpath for draining fluid which extends through the drain assembly.

BEST MODE FOR CARRYING OUT THE INVENTION

Figure 1:
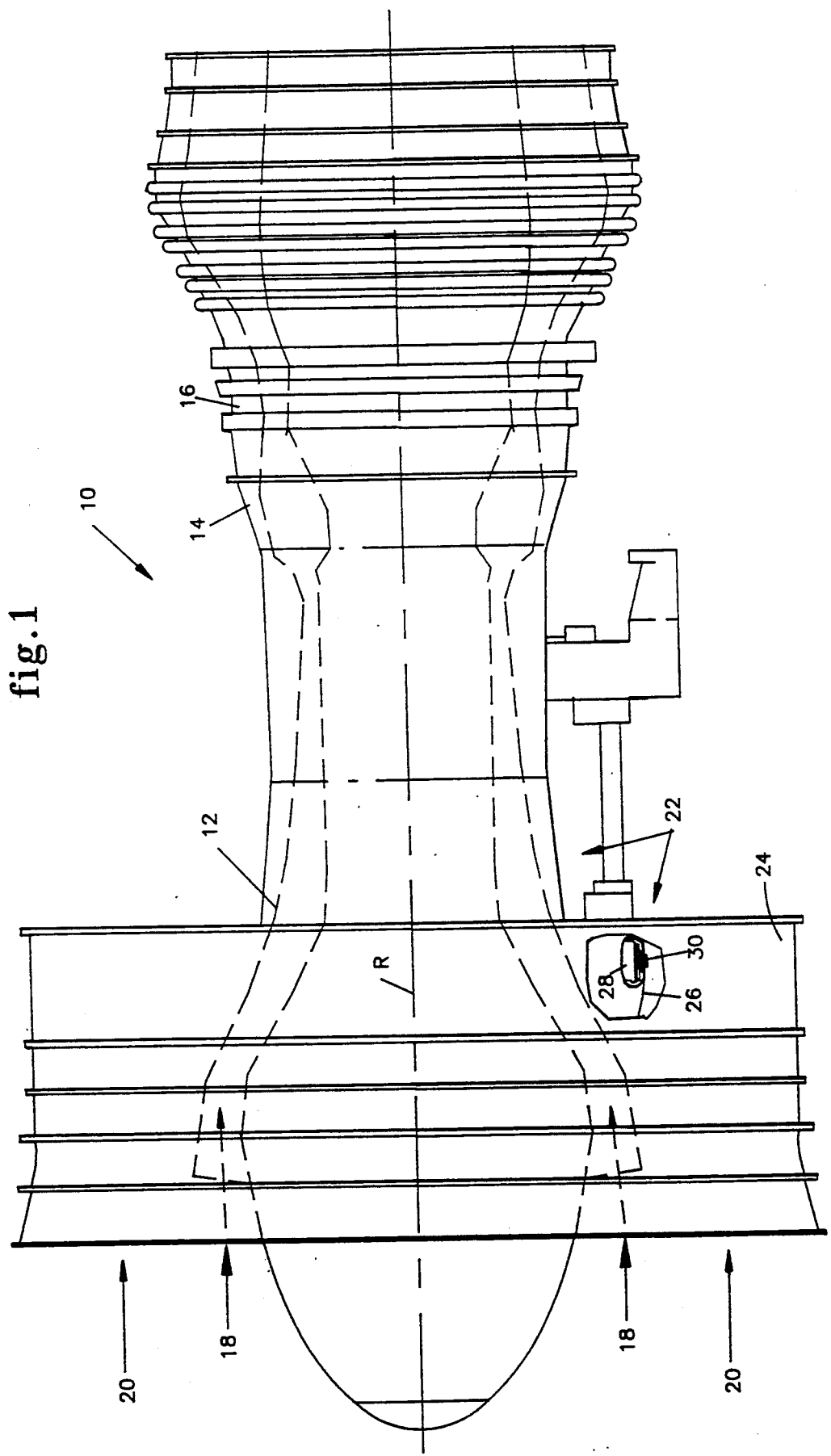
FIG. 1 is a side elevation view of an axial flow, gas turbine engine with a portion of the fan duct broken away to show a secondary flowpath and a portion of a drain assembly.

FIG. 1 is a side elevation view of a turbofan gas turbine engine 10 which has axis of rotation R. The engine has a compression section 12, a combustion section 14, and a turbine section 16. An annular flowpath 18 for primary working medium gases extends axially through the sections of the engine. A portion of the flowpath is shown by the dotted lines. A secondary flowpath 20 for working medium gases extends axially through the engine outwardly of the primary flowpath.

A stator assembly 22 extends axially through the engine to bound the secondary flowpath. The stator assembly includes a fan duct 24 and an engine case 26. A case is any protective covering, sheath or housing whether on the interior of a structure or not. The engine case 26 is closely adjacent to internal structure 28 to minimize the radial profile of the engine case. For example, the clearance between the structure and the engine case might be as small as one-half of an inch (0.50"). A drain assembly 30 is disposed between the internal structure and the bottom of the engine case. The drain assembly places the interior of the engine case in flow communication with the secondary flowpath for working medium gases 20. The drain assembly is exaggerated in size for clarity.

FIG. 2 is a partial perspective view of the engine case 26 and an exploded view of the drain assembly 30. The engine case 26 has a first side 32 facing the interior of the engine case and a second side 34 facing the secondary flowpath. A drain opening 36 in the engine case extends between the first side and the second side. The opening is cylindrical and is disposed about the axis A. The opening might be cylindrical, rectangular or any other shape in which case the axis A would be equally spaced from opposite surfaces extending through the engine case. The drain assembly may be formed of any ductile, corrosion resistant material which is compatible with the adjacent environment. One material which is acceptable is a stainless steel alloy as set forth in Aerospace Material Specification (AMS) 5510.

The drain assembly 30 includes a cylindrical plug assembly 38 and a circular cover 42. The circular cover has a circular edge 44. A rim section 46 extends circumferentially about the cover and inwardly from the edge. The rim section engages the first side of the engine case. The rim section includes a plurality of (that is, two or more) inlet passages 48 which extend parallel to the case. The inlet passages are spaced circumferentially one from the other and extend radially inward from the edge. The inlet passages are bounded in part by the inside case. Not using additional cover material to bound the passage at this location reduces the radial height of the drain assembly. In alternate constructions, the cover might entirely bound the inlet passages, especially where radial height is not of significant importance.

The rim section 46 includes a raised central section 52. A wall 54 extends axially inward to the rim section and circumferentially between the inlet passages. The raised central section includes four circumferentially extending slots 56 which are each circumferentially aligned with an associated inlet passage 48.

The cylindrical plug assembly 38 has a plate 58 facing the second side 34 of the engine case. The plate has an outlet passage 62 which extends in a direction which is substantially perpendicular to the inlet passage 48. A resilient seal member 64 extends circumferentially about the outlet passage and disposed between the plate and the engine case. The resilient seal member is formed of an adhesive/sealant such as a flame resistant, silicone rubber. One suitable material is DAPCOCAST No. 18-4 which is available from D Aircraft Products, Inc., Anaheim, Calif. 92807.

The cylindrical plug assembly 38 includes an integral baffle member 66 having an opening 71 in flow communication with the opening 62. The baffle is attached to the plate 58 by brazing or any other suitable bonding technique or by mechanical fasteners such as screws, rivets, or any other suitable fastener. In some embodiments, the baffle member may not be attached to the plate 58 or it may be formed as one piece with the plate. Each baffle member has a plurality of tabs 68. Each tab extends axially from the baffle and is aligned with an associated hole 56 in the cover. The tabs are circumferentially spaced one from the other leaving an opening 72 therebetween.

Figure 3:
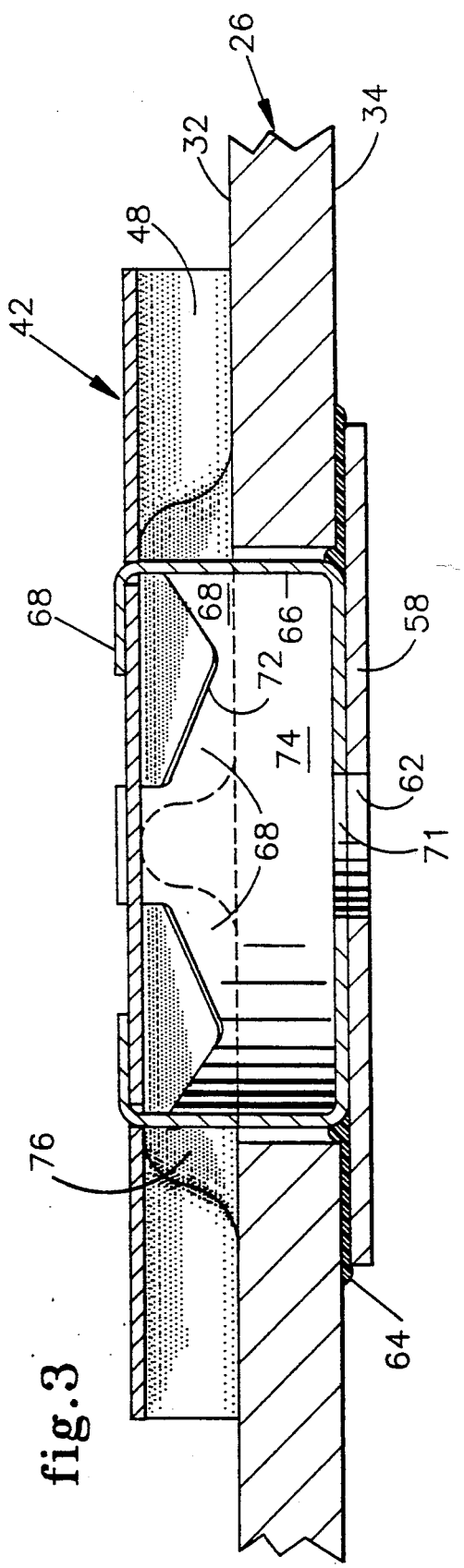
FIG. 3 is a side elevation cross-sectional view of the engine case and the drain assembly.

FIG. 3 is a side elevation, cross-sectional view of the drain assembly 30 shown in FIG. 2 in the assembled condition. The drain assembly has a drain chamber 74 disposed on the interior of the assembly. The drain chamber extends between the cover 42 and the plug assembly 38. The baffle 66 bounds the drain chamber.

As shown in FIG. 3, each tab 68 of the baffle is circumferentially aligned with and radially faces an associated inlet passage 48 of the cover. The tab extends axially through the cover and is bent over in the assembled condition to attach the baffle and the plate to the cover. The tab 68 extends laterally with respect to the inlet passage and to the wall 54 to block line of sight communication from the inlet passage to the drain chamber 74. The tab is spaced radially from the wall leaving a circumferentially extending manifold 76 between the wall and the baffle. The opening 72 between each pair of tabs is not radially aligned with the inlet passage and places the manifold in flow communication with the drain chamber 74.

As shown in FIG. 3, the resilient, elastomeric material 64 is compressed during assembly and provides a seal between the baffle 66 and the opening 36 in the wall of the case. The baffle is preferably formed of a diameter slightly smaller than the opening 36 to minimize the gap G between the baffle and the opening. The gap G is exaggerated for clarity. As will be realized, the resilient material might extend directly between the baffle and the opening in those embodiments where the gap G would permit the resilient material to extend into that location. In addition, the resilient material might be disposed between the cover and the first side of the case for additional damping but this would add to the radial height of the construction. Alternatively, the drain assembly might be oriented so that the cover is disposed on the outside 34 of the case and the plate disposed in the inside of the case.

Figure 4:
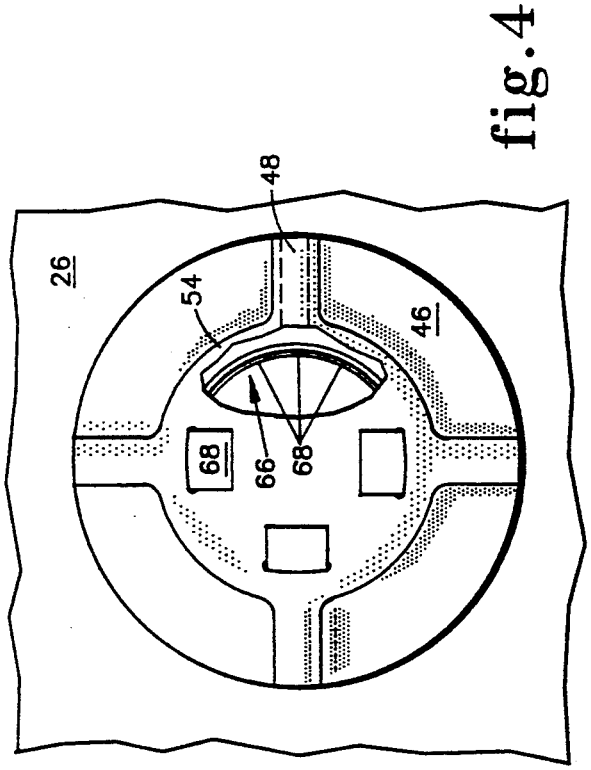
FIG. 4 is a view from above of the drain assembly shown in FIG. 3 with a portion of the cover broken away to show an inlet passage and a portion of a baffle.

FIG. 4 is a top view of the cover 42 shown in FIG. 2 and FIG. 3 showing the relationship of the baffle 66 and its tab 68 to the wall 54 and the inlet passage 48 in the cover. As shown, the tab 68 radially faces and is circumferentially aligned with the inlet passage 48.

FIG. 5 is a partial perspective view of the drain assembly 28 shown in FIG. 2 showing the relationship of the flowpath 78 for drain fluid, each of which extends through an inlet passage 48 and the opening 72 between the adjacent tabs 68. As can be seen, each flowpath enters parallel to the engine casing, is diverted laterally by the baffle, enters the drain chamber 74 where it makes a right angle turn toward the openings 62,71 in the baffle and the plate which form the outlet passage for the plug assembly. The flowpaths 78 extend through the openings into the secondary flowpath 20.

As shown by FIG. 5, the fluid follows a tortuous path through the drain assembly. The tortuous path prevents flames from either side of the case from passing through the drain assembly. In the unlikely event that a fire does occur in the engine case, and there is fluid draining from the engine case, the low radial height of the cover and the inlet passages ensures that the inlet passages are covered with fluid. In addition to the path through the drain providing a flameproof barrier by reason of the inability of the flame to change directions, the fluid flowing through the drain which fills the drain will further block the flames from passing through the case.

An advantage is the ease of fabricability which results from using a two piece assembly by forming the baffle and plate as a single unitary plug assembly. During construction of the engine, this permits inserting the core assembly through the opening 36 in the case. The cover 42 is disposed on the other side of the case. Each tab 68 engages an associated opening 56 in the cover 42. The tabs are bent over to secure the baffle to the cover, compressing the resilient silicone, elastomeric material between the plate and the engine case. The tabs alone allow the drain assembly to accommodate different thicknesses of the engine case while still permitting the drain assembly to provide a baffled flowpath.

Another advantage is the simplicity of forming the components of the structure which results from combining the retention device with the baffle in a single device by having the tabs extend radially outward at a location where the tabs interrupt line of sight communication between the inlet passage 48 and the drain chamber 74.

Although the invention has been shown and described with respect to detailed embodiments thereof, it should be understood by those skilled in the art that various changes in form and detail thereof may be made without departing from the spirit and scope of the claimed invention:

We claim:

1. A method of forming a drain assembly for an engine case having a first side and a second side facing in opposite directions and an opening in the case which extends from the first side to the second side, comprising:
    disposing a cover on the first side of the case such that the cover engages the case, the cover including at least one first passage which extends through the cover to the opening;
    disposing a plate on the second side of the engine case which faces the engine case to form a drain chamber therebetween and providing at least one second passage through the plate to the drain chamber;
    disposing a baffle in the opening between the cover and the plate, and providing the baffle with a plurality of openings for placing the first passages in flow communication with the drain chamber;
    attaching the baffle to the plate and to the cover to urge the plate and the cover toward the outer case.

2. The method of forming the drain assembly of claim 1 which further includes forming tabs on the baffle which extend away from the plate and attaching the baffle to the plate prior to disposing the baffle in the opening, inserting the tabs through the cover and bending the tabs over to urge the cover and the plate toward the engine case, thereby securing the drain assembly to the engine case.

3. The method of forming a drain assembly of claim 1 wherein the step of disposing the plate on the first side of the case includes the step of orienting the cover such that each first passage extends parallel to the first side and the step of disposing the baffle includes the step of extending the baffle laterally with respect to the passages to block line of sight communication of the passages with the drain chamber and spacing the opening in the baffle from the inlet passages so as to not interrupt the blockage of line of sight communication between the inlet passages and the drain chamber.

4. The method of forming the drain assembly of claim 1 which includes the step of disposing a resilient material between the plate and the second side, the resilient material extending circumferentially about the outlet passage.

5. The method of forming the drain assembly of claim 4 wherein the gas turbine engine has a secondary flowpath for working medium gases and wherein the step of disposing the plate on the second side of the engine case includes orienting the drain assembly such that the plate faces and is adjacent to the secondary flowpath for working medium gases.

* * * * *